Dec. 11, 1956 — R. A. ZOTTOLI — 2,773,475
DEVICE FOR WEANING YOUNG ANIMALS
Filed Oct. 14, 1954
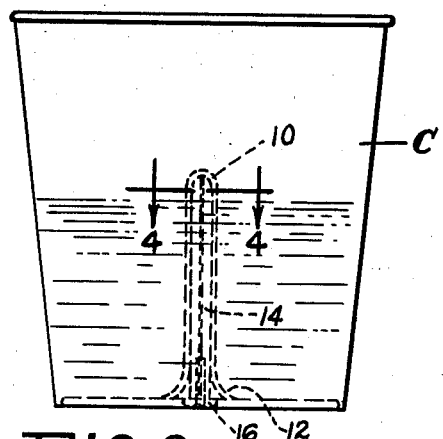
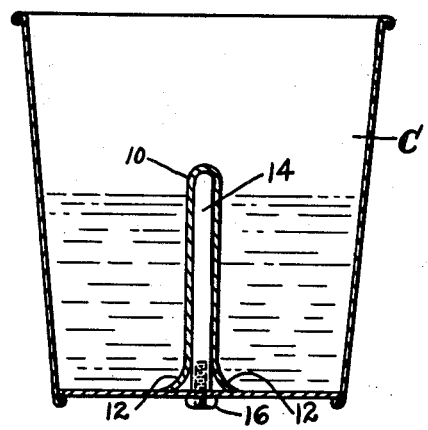
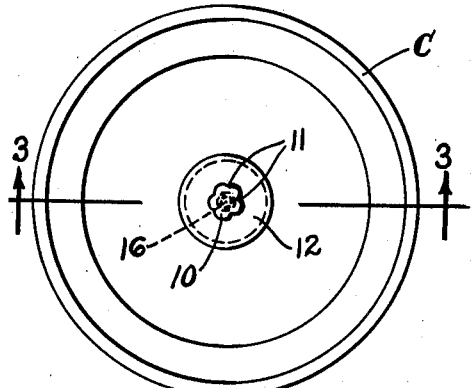
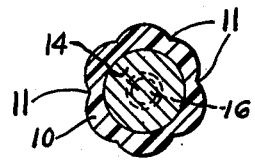
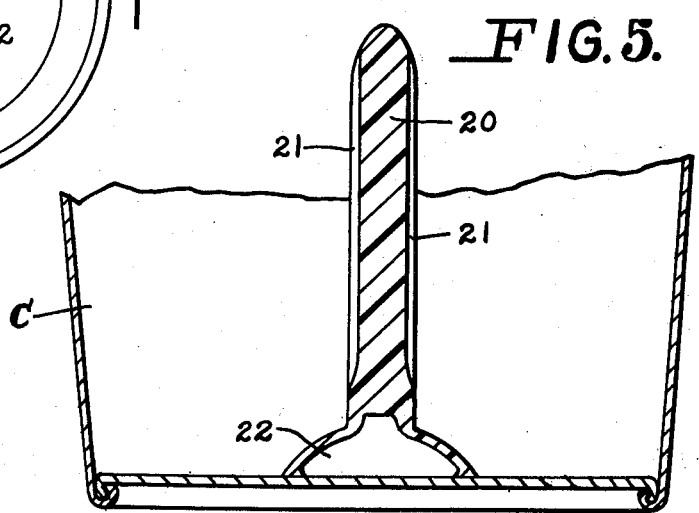
INVENTOR.
Robert A. Zottoli
BY Harold E. Cole
Attorney

United States Patent Office 2,773,475
Patented Dec. 11, 1956

2,773,475

DEVICE FOR WEANING YOUNG ANIMALS

Robert A. Zottoli, Brunswick, Maine

Application October 14, 1954, Serial No. 462,177

3 Claims. (Cl. 119—71)

This invention relates to a device for weaning a young animal such as a calf.

It is well known that young animals, such as calves, when being weaned, will not readily take liquid food, such as milk, from a new source, and that there is considerable difficulty in inducing them to take any milk from a container, hence my object is to provide a device so attractive to a young animal, being weaned, that the youngster will immediately take milk or other liquid food, from a container such as a pail.

Another object is to provide such a device that can be attached to a container and from which the young animal cannot actually obtain any milk; but its attraction is such that the animal will take it in his mouth and thereby contact the milk in the container and consume it while under the impression that he is obtaining it from the device.

A further object is to provide such a device that is economical to manufacture and can readily be attached to a container either permanently, or removably.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

Fig. 1 is a side elevational view of my device attached to a container.

Fig. 2 is a top plan view thereof.

Fig. 3 is a sectional view taken on the line 3—3 of Fig. 2.

Fig. 4 is an enlarged, sectional view taken on the line 4—4 of Fig. 1.

Fig. 5 is a longitudinal, sectional view of a modified form of my device, the container it is attached to being shown broken away.

As illustrated, my device has a projecting member 10 that is a false nipple, and which may be shaped to closely resemble a cow's teat, for instance, and which is made of a relatively tough, but flexible material, such as rubber or a rubber composition. It is closed at its upper end, hence it serves as a dummy teat, and the remainer may be solid or hollow. I show longitudinally extending recesses 11 in said false nipple 10 whereby milk will more readily enter a calf's mouth when it seizes the nipple. These recesses extend more than half the length of said nipple.

Said nipple 10 has a bottom or base portion 12 which may be fixed to a pail or other container C. In this construction the nipple is hollow, and a solid core 14 extends from a point near the upper end of the nipple downwardly through said base portion 12 and through the bottom of the pail. A screw enters the core to fixedly hold the nipple in upright position in the pail.

In use, the container C is filled with milk or other liquid to a point slightly below the nipple 10, so the latter will be clearly visible to the young animal, consequently upon opening his or her mouth and grasping the closed nipple, the milk in the container, surrounding the nipple, enters the animal's mouth. The animal may continue to suck on the nipple, but will get nothing from that source. However, it will contact the milk and continue to consume it. The finger is of predetermined length, so that it cannot extend too far into the animal's mouth, and tend to choke it.

In Fig. 5 of the drawings my nipple 20, with longitudinally extending recesses 21, has a suction cup 22 that serves as a base, and which can be removably attached to the bottom of a container C in the usual way.

By providing a closed or false nipple the young animal can only obtain milk directly from the container, hence it learns to associate milk with the container, and soon it takes milk from a container without any device.

What I claim is:

1. A device for weaning an animal comprising a container having a bottom, a false nipple extending substantially normally from a midportion of said bottom a distance less than the height of said container.

2. A device as set forth in claim 1, said nipple embodying a core in its interior.

3. A device as set forth in claim 1, said nipple being solid at its lower portion and having an opening in said lower portion to receive an attaching pin.

References Cited in the file of this patent

UNITED STATES PATENTS

| 336,225 | Funk | Feb. 16, 1886 |
| 1,426,252 | Bratcher et al. | Aug. 15, 1922 |
| 2,533,643 | Verner | Dec. 12, 1950 |

FOREIGN PATENTS

| 167,782 | Austria | Feb. 26, 1951 |